(12) United States Patent
Chen et al.

(10) Patent No.: US 12,363,562 B2
(45) Date of Patent: Jul. 15, 2025

(54) METHODS AND DEVICES FOR ROUTING AND BEARER MAPPING CONFIGURATION

(71) Applicant: ZTE CORPORATION, Shenzhen (CN)

(72) Inventors: Lin Chen, Shenzhen (CN); Wei Luo, Shenzhen (CN); Mengzhen Wang, Shenzhen (CN); Wei Zou, Shenzhen (CN); Xueying Diao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 661 days.

(21) Appl. No.: 17/708,502

(22) Filed: Mar. 30, 2022

(65) Prior Publication Data

US 2022/0225129 A1 Jul. 14, 2022

Related U.S. Application Data

(63) Continuation of application No. PCT/CN2019/109449, filed on Sep. 30, 2019.

(51) Int. Cl.
*H04W 24/04* (2009.01)
*H04L 45/28* (2022.01)
*H04W 40/34* (2009.01)

(52) U.S. Cl.
CPC ............ *H04W 24/04* (2013.01); *H04L 45/28* (2013.01); *H04W 40/34* (2013.01)

(58) Field of Classification Search
CPC ..... H04W 24/04; H04W 40/34; H04W 40/22; H04W 28/0263; H04L 45/28
See application file for complete search history.

(56) References Cited

U.S. PATENT DOCUMENTS

| 10,044,603 B1 | 8/2018 | Singh et al. |
| 2015/0085639 A1 | 3/2015 | Chen |
| 2020/0413457 A1* | 12/2020 | Hong .................... H04W 76/10 |

FOREIGN PATENT DOCUMENTS

| CN | 110167093 | | 8/2019 | |
| GB | 2586261 A | * | 2/2012 | ............. H04L 45/74 |

OTHER PUBLICATIONS

Japanese Office Action issued Nov. 17, 2023 in corresponding Japanese Patent Application No. 2022-519472 with English translation.
Indian First Examination Report issued Sep. 9, 2022 in corresponding Indian Application No. 202217017003.
Extended European Search Report issued Sep. 15, 2022 in corresponding European Application No. 19947737.3.

(Continued)

*Primary Examiner* — Kibrom T Hailu
(74) *Attorney, Agent, or Firm* — Crowell & Moring LLP

(57) ABSTRACT

This disclosure relates to methods and devices for routing and bearer mapping configuration in an integrated access and backhaul (IAB) network. In one implementation, the method may include detecting, by an IAB entity, a failure in transmitting a packet via an egress link of an original routing path. The method may further include selecting, by the IAB entity, a backhaul adaption protocol routing identifier of a backup routing path for the packet. The method may further include selecting, by the IAB entity, an egress backhaul radio link control channel on an egress link of the backup routing path for transmitting the packet.

8 Claims, 10 Drawing Sheets

(56) References Cited

OTHER PUBLICATIONS

ZTE et al. "Consideration on Routing in IAB", 3GPP Draft; R3-192514_Consideration on Routing in IAB, 3$^{rd}$ Generation Partnership (3GPP), Mobile Competence Centre; 650 Route Des Lucioles; F-06921 Sophia-Antipolis Cedex, France, vol. RAN WG3, No. Reno, USA; May 5, 2019.
Office action issued in Korean application No. 10-2022-7010687, dated Sep. 19, 2024, 7 pgs (with English translation).
ZTE et al. "Discussion on IAB multiple connectivity,"3GPP TSG RAN WG2 Meeting #106, May 2019, 4 pages.
International Search Report issued Jun. 29, 2020 in International Application No. PCT/CN2019/109449.
Written Opinion issued Jun. 29, 2020 in International Application No. PCT/CN2019/109449.
ZTE et al. "Discussion on IAB multiple connectivity" 3GPP TSG-RAN WG2 Meeting #106, R2-1906534, May 3, 2019 (May 3, 2019), section 2.
ITRI. "Discussion on BAP layer routing ID" 3GPP TSG-RAN WG2 Meeting #106, R2-1907611, May 3, 2019 (May 3, 2019), section 2.
AT&T. "Routing identifier for routing at BAP layer" 3GPP TSG-RAN WG2 Meeting #106, R2-1907373, May 3, 2019 (May 3, 2019), whole document.
Japanese Notice of Reasons for Rejection issued May 30, 2023 in corresponding Japanese Patent Application No. 2022-519472 with English translation.
Huawei, Routing in IAB network[online], 3GPP TSG RAN WG3 #105 R3-194343, Internet <URL:https://www.3gpp.org/ftp/tsg_ran/WG3_lu/TSGR3_105/Docs/R3-194343.zip>, Aug. 17, 2019.
Huawei, IAB bearer mapping for other traffic[online], 3GPP TSG RAN WG3 #105 R3-194348, Internet <URL:https://www.3gpp.org/ftp/tsg_ran/WG3_lu/TSGR3_105/Docs/R3-194348.zip>, Aug. 17, 2019.
Chinese Office Action with English translation, dated May 10, 2024, pp. 1-16, issued in Chinese Patent Application No. 201980100987.5, State Intellectual Property Office, Beijing, China.
Chinese Office Action with English translation, dated May 10, 2024, pp. 1-21, issued in Chinese Patent Application No. 2024051000003610, State Intellectual Property Office, Beijing, China.
ZTE, Consideration on IAB many to one bearer mapping, Aug. 26-30, 2019, pp. 1-3, 3GPP TSG-RAN WG3#105 R3-193648, Ljubljana Slovenia.
Huawei, Routing in IAB network, Aug. 26-30, 2019 pp. 1-4, 3GPP TSG-RAN WG3 meeting #105 R3-194343, Ljubljana, Slovenia.
ZTE, Sanechips, Discussion on IAB multiple connectivity, May 13-17, 2019, pp. 1-4, 3GPP TSG RAN WG2 Meeting #106 R2-1906534, Reno, USA.
Chinese Ofice Action issued Oct. 24, 2023 in corresponding Chinese Patent Application No. 201980100987.5.
"R3-193648 Consideration on many to one IAB bearer mapping" Aug. 17, 2019.
"R2-1910904 Open Issues for IAB" Aug. 16, 2019.
"R2-1906576 Discussion on BH RLC channel configuration in IAB network" May 3, 2019.
R2-1906064 "Routing function and configuration" May 3, 2019.

* cited by examiner

METHODS AND DEVICES FOR ROUTING AND BEARER MAPPING CONFIGURATION

This application is a continuation application of PCT International Application No. PCT/CN2019/109449, filed with the China National Intellectual Property Administration, PRC on Sep. 30, 2019, which is herein incorporated by reference in its entirety.

TECHNICAL FIELD

This disclosure is directed generally to wireless communications and particularly to routing and bearer mapping configuration in an integrated access and backhaul network.

BACKGROUND

As the number of applications and services for digital data explodes, the demands and challenges placed on network resources and operators keep increasing. The capability to deliver a wide variety of network performance characteristics that future services will demand is one of the primary technical challenges faced by service providers. The performance demands on the connectivity of communication network in terms of data rate, latency, quality of service (QoS), security, availability, and many other parameters vary from one service to the other. In this regard, enabling a network to allocate resources in a flexible manner to provide customized connectivity for different type of services is desirable to meet various demands on network communication.

SUMMARY

This disclosure is directed to methods, systems, and devices related to wireless communication, and more specifically, for routing configuration and bearer mapping configuration in an integrated access and backhaul network.

In one embodiment, a method for wireless communication by an integrated access and backhaul entity is disclosed. The method may include detecting a failure in transmitting a packet via an egress link of an original routing path. The method may further include selecting a backhaul adaption protocol routing identifier of a backup routing path for the packet. The method may further include selecting an egress backhaul radio link control channel on an egress link of the backup routing path for transmitting the packet.

In another embodiment, a method for wireless communication by an integrated access and backhaul entity is disclosed. The method may include determining that a received backhaul adaption protocol packet data unit contains an exceptional backhaul adaption protocol routing identifier. The method may further include discarding the received backhaul adaption protocol packet data unit.

In another embodiment, a method for wireless communication by an integrated access and backhaul entity is disclosed. The method may include detecting a backhaul failure. The method may further include sending a failure information for the backhaul failure to an integrated access and backhaul donor central unit.

In another embodiment, a method for wireless communication by an integrated access and backhaul entity is disclosed. The method may include receiving a configuration information of a backhaul radio link control channel from an integrated access and backhaul donor central unit. The method may further include configuring the backhaul radio link control channel based on the configuration information.

In another embodiment, a method for wireless communication by an integrated access and backhaul entity is disclosed. The method may include receiving a routing selection information an integrated access and backhaul donor central unit. The routing selection information comprises one or more routing selection entries, each of which comprises a destination internet protocol address and a backhaul adaption protocol routing identifier. The method may further include using the routing selection information to select a routing path for packet transmission.

In another embodiment, a method for wireless communication by an integrated access and backhaul entity is disclosed. The method may include receiving a bearer mapping configuration information from an integrated access and backhaul donor central unit. The bearer mapping configuration information comprises one or more bearer mapping entries for each egress backhaul radio link control channel. The method may further include using the bearer mapping configuration information to select an egress backhaul radio link control channel for packet transmission.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims below.

DETAILED DESCRIPTION

Figure 1:
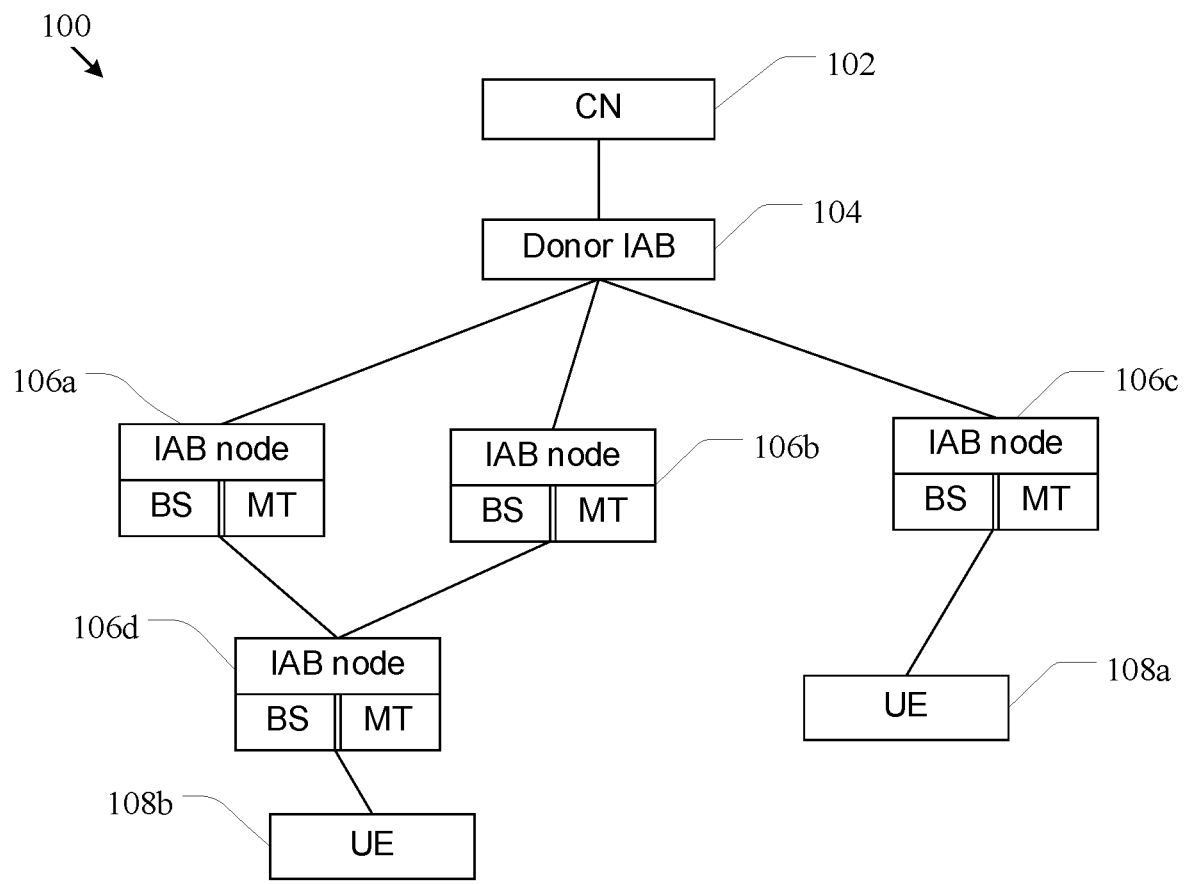
FIG. 1 shows a block diagram of an exemplary TAB architecture network.

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

The evolving new generation wireless communication network such as 5G network develops a split network architecture in which the Radio Access Network (RAN) functionality is split between a central unit (CU) and multiple distributed units (DUs). For example, RAN functions may be split at the point between the Packet Data Convergence Protocol (PDCP) layer and the Radio Link Control (RLC) layer of the 5G protocol stack. DUs will perform layer functions up to and including the RLC layer functions and the CU will perform PDCP layer and upper layer functions prior to the core network. Through the isolation of the stack from the PDCP layer and upper layers, the CU are able to function as a cloud-based convergence point among networks using multiple heterogeneous technologies and thus can serve multiple heterogeneous DUs.

Another technology being developed for the evolving new generation wireless communication network such as 5G is an Integrated Access and Backhaul (IAB) architecture for providing high-speed wireless backhaul to cell sites such as a 5G new radio (NR) base station, a 5G central-unit base station, a 5G distributed-unit base station, a 5G core station, or an application server. As data demands and the number of cell sites increase, it is becoming more difficult to provide traditional fiber optic backhaul access to each cell site, which is especially the case for small cell base stations. Under the IAB architecture, the same infrastructure and resources (e.g., IAB nodes) can be used to provide both access and backhaul to support User Equipment (UE) Packet Data Unit (PDU) sessions. For example, the IAB architecture for New Radio (NR) networks will provide wireless backhaul and relay links enabling flexible and dense deployment of NR cells without the need for densifying the transport network proportionately. Additionally, IAB technologies will allow for easier deployment of a dense network of self-backhauled NR cells in a more integrated and robust manner. For example, the IAB technology in the 5G NR network will support a multi-hop relay system, where the network topology also supports redundant connections.

FIG. 1 illustrates a block diagram of an exemplary IAB architecture network 100. As shown, a core network (CN) 102 has a wired or cabled connection (e.g., a fiber optic cable) to a donor IAB node 104. The donor IAB node 104 is wirelessly coupled to a plurality of intermediate IAB nodes 106a and 106b and two serving IAB nodes 106c and 106d. Herein, the term "coupled" refers to direct or indirect and wired or wireless communications between nodes or devices.

With continued reference to FIG. 1, the serving IAB nodes 106c and 106d are directly coupled to UEs 108a and 108b, respectively, and function as the serving cell site base stations or access points for the UEs 108a and 108b. The UEs 108a and 108b are referred to herein as "access UEs." The UEs may include but is not limited to a mobile phone, smart phone, tablet, laptop computer, a smart electronics or appliance including an air conditioner, a television, a refrigerator, an oven, or other devices that are capable of communicating wirelessly over a network. The serving IAB nodes 106c and 106d also function as relay and can forward their respective UE signals to their respective next uplink nodes in the transmission path, and forward downlink signals to UEs 108a and 108b respectively. As shown in FIG. 1, the serving IAB node 106c may forward uplink UE signals to one or both of the intermediate IAB nodes 106a and 106b, and receive downlink UE signals from one or both of the intermediate IAB nodes 106a and 106b. The intermediate IAB nodes 106a and 106b may forward uplink UE signals to the donor IAB node 104, and forward downlink signals to the serving IAB node 106d. The serving IAB node 106c may forward uplink UE signals to the donor IAB node 104, which may then forward all received signals to the core network 102, and may forward downlink signals from the donor IAB node 104 to the access UE 108a.

Each of the IAB nodes 106a-106d may have two functions: a base station (BS) function and a mobile terminal (MT) function. The BS function means the IAB node can work like a base station to provide the radio access function for a UE. Herein, the "BS part" of an IAB node refers to BS function part of the IAB node, including all hardware, firmware and/or software related to performing the BS functions of the IAB node. The MT function means the IAB node can work like a mobile terminal to be controlled and scheduled by the IAB donor node or an upper IAB node. Herein the "MT part" of an IAB node refers to MT function part of the IAB node, including all hardware, firmware and/or software related to performing the MT functions of the IAB node.

Figure 2:
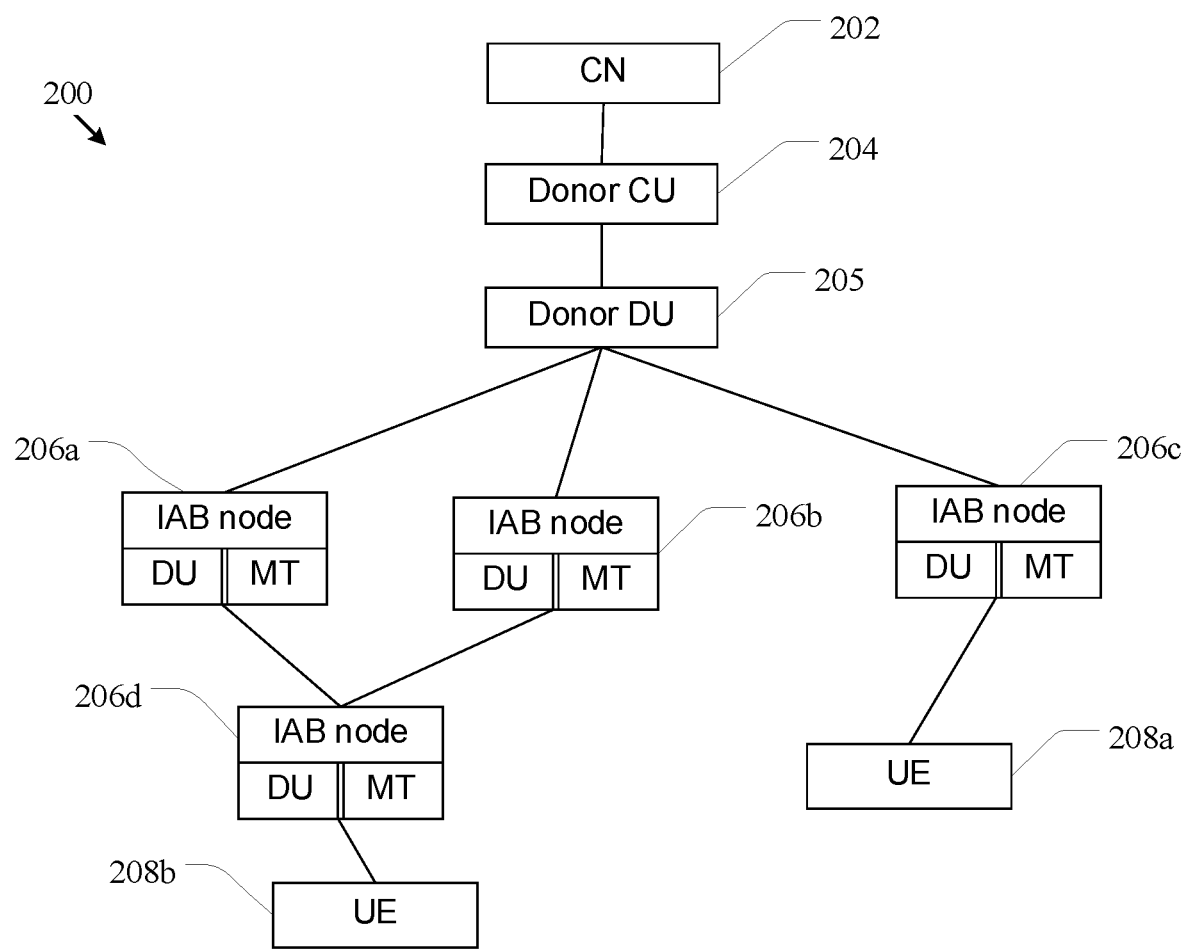
FIG. 2 shows a block diagram of an exemplary IAB architecture network implementing a split architecture.

FIG. 2 illustrates a block diagram of an exemplary IAB architecture network 200 which implements a split architecture on the IAB network 100 in FIG. 1. As shown in FIG. 2, the donor IAB node 104 in FIG. 1 is replaced by a donor CU 204 which has a wired connection to the core network 202. A donor distributed unit (DU) 205 has a wired connection to the donor CU 204. Each of the IAB nodes 206a-206d would be coupled to the donor DU 205 in similar fashion to IAB nodes 106a-106d coupling to the donor IAB node 104 in FIG. 1.

In the IAB network 200, each of the IAB nodes 206a-206d have two functions: a DU function and a mobile terminal (MT) function. The DU function means the IAB node can work like a DU to provide the predetermined DU functions for a UE. Herein, the "DU part" of an IAB node refers to DU function part of the IAB node, including all hardware, firmware and/or software related to performing the DU functions of the IAB node. The MT function and MT part of an IAB nodes in the IAB network 200 are the same as described above for the IAB network 100 in FIG. 1.

For simplicity and clarity, only a few of IAB nodes and UEs are shown in the IAB network 200. It will be appreciated that there can be more access IAB nodes and intermediate IAB nodes in the IAB network, and each IAB node may serve one or more UEs simultaneously.

Such combined implementation of the split architecture and the IAB architecture technologies may raise issues such as how to configure the Backhaul (BH) RLC channel on IAB node along the data forwarding path to relay the UE data packets, how to mapping the ingress and egress BH RLC channels, how to find a new routing path and egress BH RLC channel when link failure happens, and the like.

Before addressing the above issues with exemplary embodiments, the present disclosure briefly introduces the traffic types in the IAB network 200, which include user plane traffic, control plane traffic, and operation and management (OAM) traffic.

User Plane (UP) Traffic

Figure 3:
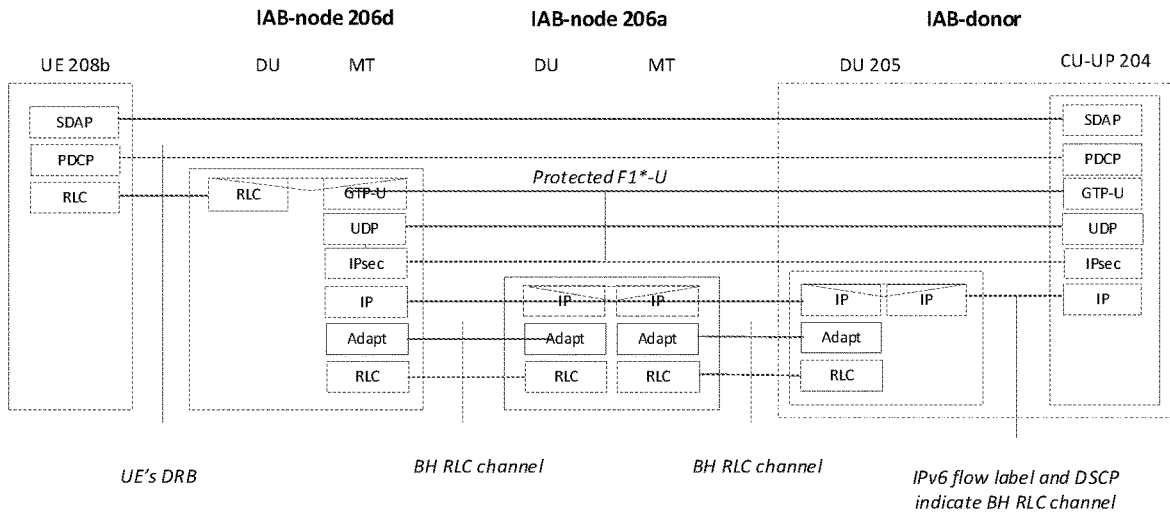
FIG. 3 shows an example protocol stack for user plane traffic in the IAB architecture network.

In the IAB network 200, when a UE 208a or 208b sets up its dedicated data radio bearers (DRBs), the backhaul RLC channels (also referred to as the backhaul radio bearers) should also be setup/modified on the IAB nodes along the forwarding data path toward the donor CU 204. An example user plane protocol stack with IPSec security protection for the IAB network is shown in FIG. 3. As seen, an adaptation layer (also referred to as Backhaul Adaptation Protocol layer, BAP layer) is above the RLC layer. The adaptation layer deals with the routing and bearer mapping in the IAB network 200.

Supposing that the IAB node 206d DU receives a data packet from the DRB of its access UE 208b, it could encapsulate the General Packet Radio Service Tunneling Protocol user plane (GTP-U) header, User Datagram Protocol (UDP) header, and Internet Protocol (IP) header to the uplink (UL) data packet and then deliver it to the adaptation layer for routing and bearer mapping. Then the adaptation layer (or adaption entity) adds the BAP subheader which may include the BAP routing identifier (ID), delivers it to the egress BH RLC channel of the egress link, and finally transmits it to upstream IAB node DU.

With regard to the downlink (DL) PDCP PDU, donor CU 205 encapsulates the GTP-U/UDP/IP header to the DL data packet and transmits it to donor DU 205 via F1-U tunnel. In order for the donor DU to distinguish the data packets from different UE DRBs or with different QoS, donor CU 205 may fill in the IPv6 flow label or perform Differentiated Service Code Point (DSCP) marking for these DL data packets. Upon receiving the DL data packets, the adaptation layer of the donor DU 205 may perform the routing and bearer mapping. In particular, the adaptation layer adds the BAP subheader including the BAP routing ID, delivers it to the egress BH RLC channel of the egress link, and finally transmits it to downstream IAB node MT.

For the intermediate IAB node such as 206a and 206b, it may be configured with the ingress and egress BH RLC channel mapping table and routing table. Upon receiving the data packet from ingress BH RLC channel, the intermediate IAB node delivers the data packet to the BAP layer, which finds the egress link based on routing table and maps the data packet to the egress BH RLC channel.

Control Plane (CP) Traffic

Figure 4A:
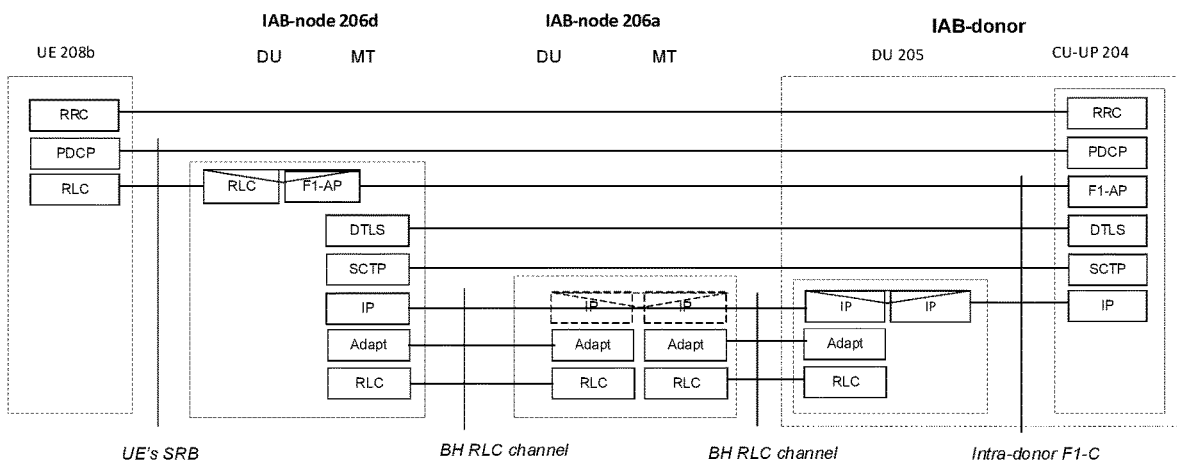
FIG. 4A-4C show an example protocol stack for control plane traffic in the TAB architecture network.
Figure 4B:
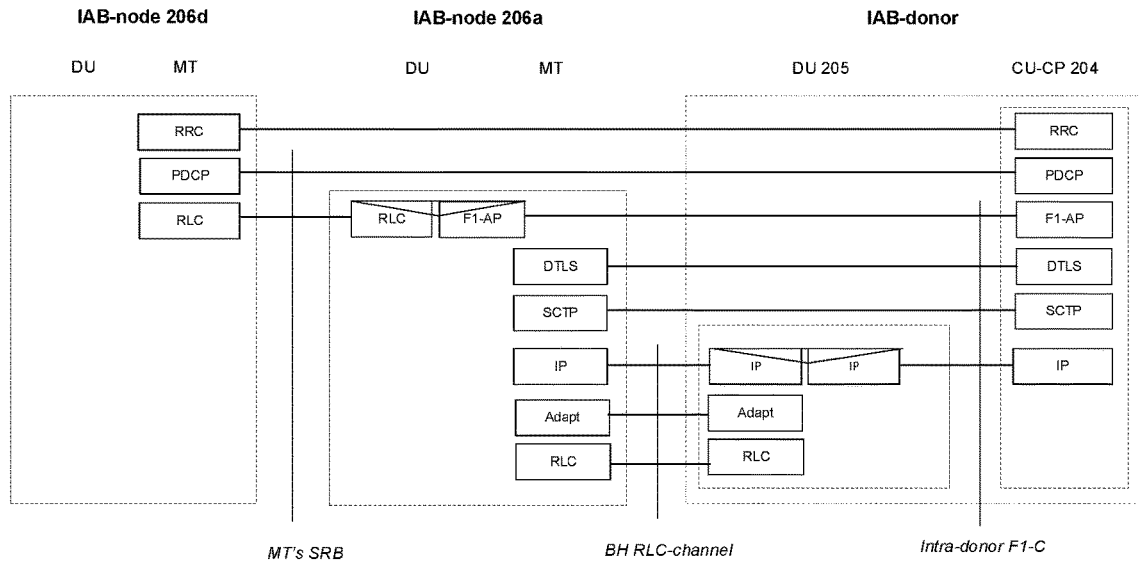
Figure 4C:
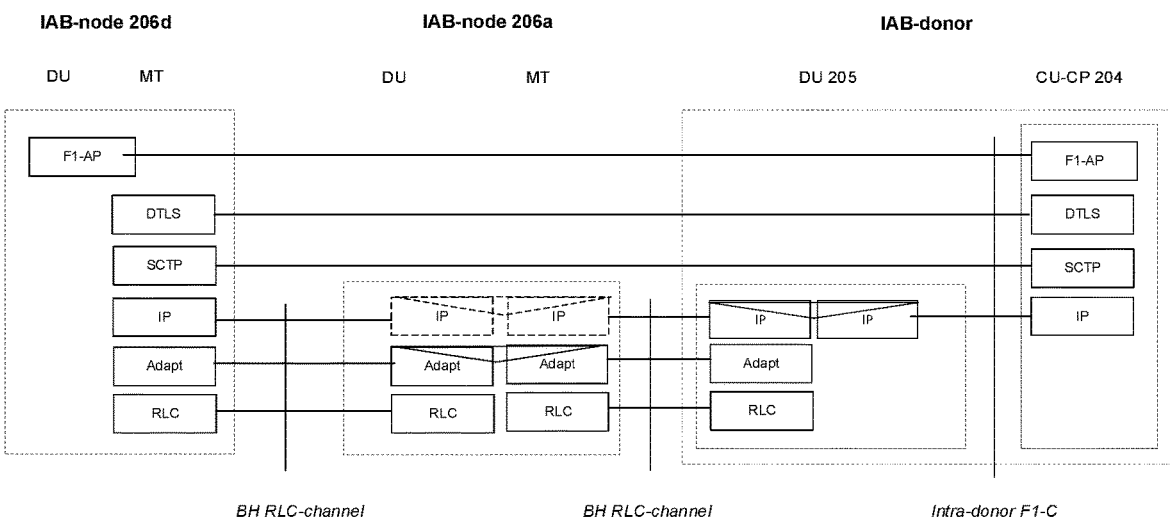

In addition to the UE bearer relevant user plane traffic, there are control plane traffic. SRB0, SRB1, SRB2, SRB3 are defined in NR to carry different types of RRC signaling between UE and gNB and have different logical channel priorities. The IAB network 200 has three types of control plane signaling: 1) UE's RRC signaling; 2) MT's RRC signaling; and 3) DU's F1-AP signaling. FIG. 4A-4C show protocol stacks for UE's RRC, MT's RRC and DU's F1-AP with security protection. In these examples, the adaptation layer resides on top of RLC and carries an IP-layer.

As shown, both UE and MT's RRC signaling are encapsulated into F1AP message. The control plane signaling can be divided into following categories:

Non UE/MT associated F1 signaling: it is used for the F1 interface management, system information transfer, paging and warning message transmission between IAB node/donor DU and donor CU.

UE associated F1 signaling: it is used for UE context management and RRC message transfer. For the RRC message transfer, it is encapsulated in the UE associated F1AP signaling. Based on the contained RRC signaling type, the UE associated F1AP message can be at least one of the following type: UE SRB0, UE SRB1, UE SRB2, UE SRB3, UE non SRB. Here the "UE non SRB" denotes that the UE context management relevant message without piggybacking UE's RRC signaling.

MT associated F1 signaling: it is used for MT context management and RRC message transfer. For the RRC message transfer, it is encapsulated in the MT associated F1AP signaling. Based on the contained RRC signaling type, the MT associated F1AP message can be at least one of the following type: MT SRB0, MT SRB1, MT SRB2, MT SRB3, MT non SRB. Here the "MT non SRB" denotes the MT context management relevant message without piggybacking MT's RRC signaling.

SCTP 4-way handshake signaling: when IAB node DU setups the F1-C connection with donor CU, it needs to setup the SCTP association. First, the IAB node DU sends INIT to donor CU. Then donor CU responds with INIT-ACK. Upon receiving the INIT-ACK, the IAB node DU sends the COOKIE-ECHO to donor CU and donor CU responds with COOKIE-ACK. After that, the IAB node DU may transmit the F1 setup message to donor CU. It should be noted that the SCTP 4-way handshake relevant signaling generated by the IAB node DU is directly delivered to the BAP layer of its co-located IAB node MT. The BAP layer of the IAB node MT performs the routing to find the routing path and egress link and then maps it to the egress BH RLC channel for subsequent multi-hop transmission to the donor CU.

OAM Traffic

Figure 5A:
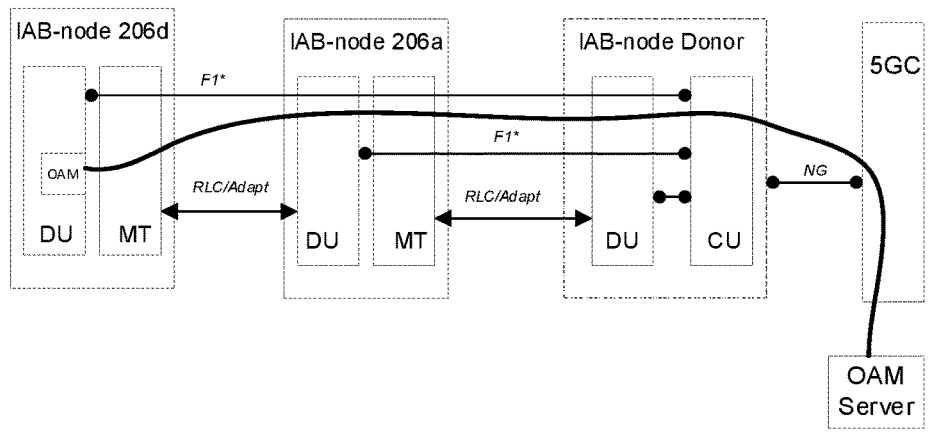
FIG. 5A-5D show an example protocol stack for operation and management traffic and its delivery in the TAB architecture network.
Figure 5B:
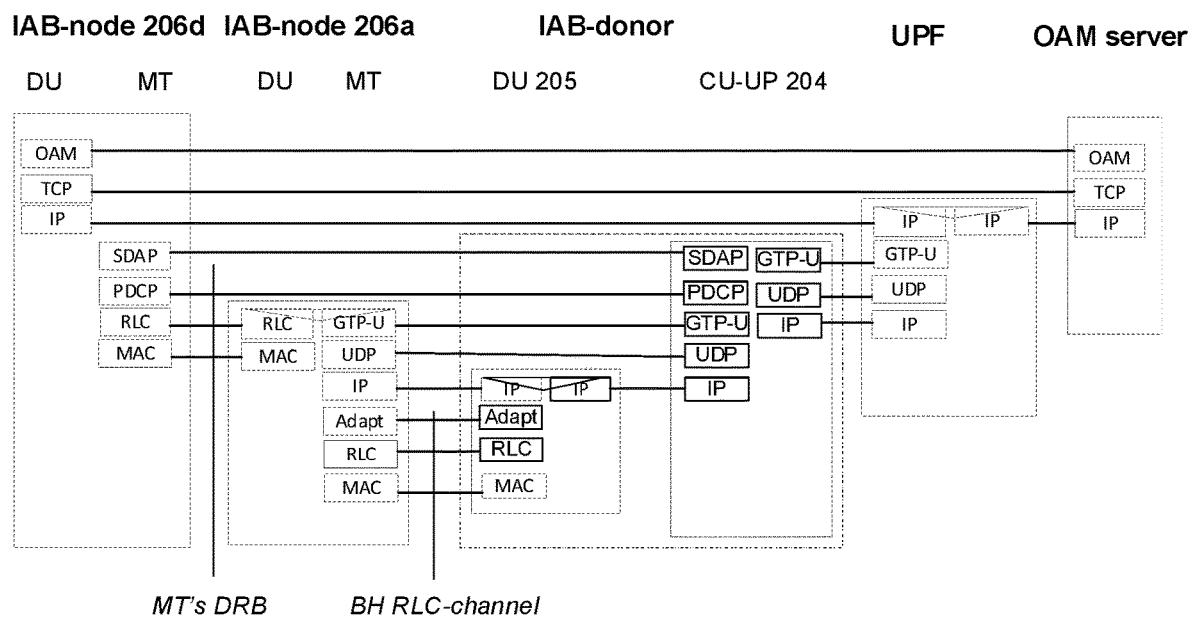
Figure 5C:
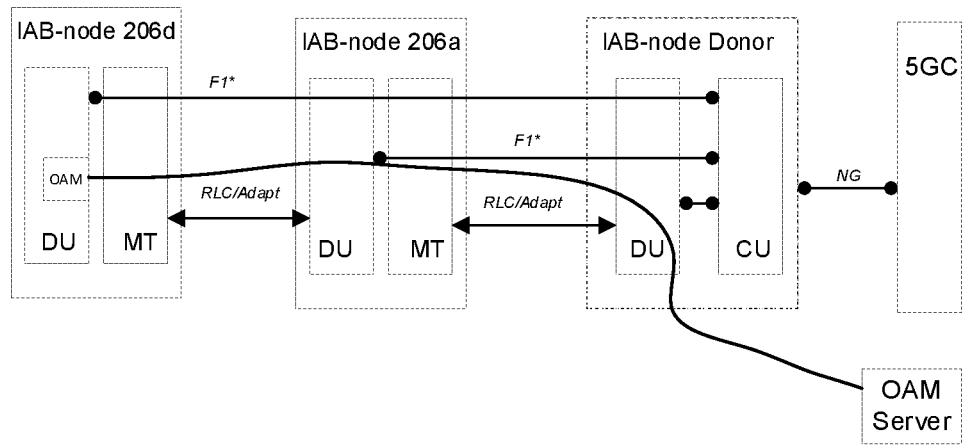
Figure 5D:
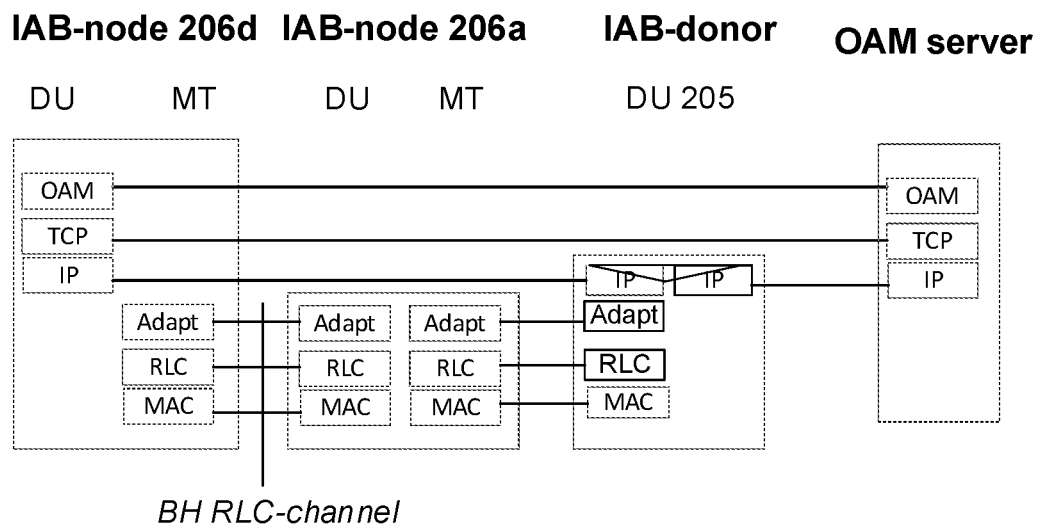

For the IAB node DU, it may be coupled to its OAM server and send alarms and traffic counter information to its OAM system, from which it receives commands, configuration data and software downloads (e.g. for equipment software upgrades). The OAM traffic could be delivered via normal PDU session (for SA) or PDN connection (for NSA) as shown in FIGS. 5A and 5B or via the Backhaul IP layer as shown in FIGS. 5C and 5D.

For the PDU session based OAM traffic transmission, the QoS required for OAM traffic is treated as normal UE's PDU session (for SA) or PDN connection (for NSA). During the PDU session (for SA) or PDN connection (for NSA) establishment procedure, the Core Network provides the QoS information to the Donor CU. For the backhaul IP layer based OAM traffic transmission, the OAM traffic uses the IP layer on top of the adaptation layer. There is no PDU session (for SA) or PDN connection (for NSA) required for the IAB node MT.

For the PDU session based OAM traffic transmission, the QoS required for OAM traffic is treated as normal UE's PDU session (for SA) or PDN connection (for NSA). During the PDU session (for SA) or PDN connection (for NSA) establishment procedure, the Core Network provides the QoS information to the Donor CU. For the backhaul IP layer based OAM traffic transmission, the OAM traffic uses the IP layer on top of the adaptation layer. There is no PDU session (for SA) or PDN connection (for NSA) required for the IAB node MT.

Generally, the bearer mapping takes place in the following three scenarios:

(1) UP/CP/OAM Packet to BH RLC Channel Mapping at IAB Node for UL Traffic

Upon receiving the UL UP/CP/OAM IP packet, the IAB node deliver it to the adaptation layer of the IAB node, which performs the routing to select the egress link (i.e. next hop IAB node) and maps the UL packet to a BH RLC channel on the egress link.

(2) UP/CP/OAM Data Packet to BH RLC Channel Mapping at IAB Donor DU for DL Traffic Upon receiving the DL packet from IAB donor CU or OAM server, the IAB donor DU deliver the IP packet to the adaptation layer of the IAB donor DU, which performs the routing to select the egress link (i.e. next hop IAB node) and maps the DL packet to a BH RLC channel on the egress link.
(3) Ingress and Egress BH RLC Channel Mapping at Intermediate IAB Node for Both UL and DL Packet.

Upon receiving the packet from ingress BH RLC channel, the intermediate IAB node performs routing to select the egress link and maps the packet to the egress BH RLC channel.

In short, in order to support the routing and bearer mapping, the BH RLC channel, the routing table, the routing selection table and the bearer mapping table should be configured for IAB node and donor DU. As discussed above, the IAB node contains a DU part and a MT part. Correspondingly, the adaptation layer (or BAP layer) also has a DU part and a MT part. The DU part is configured through F1AP while the MT part is configured through RRC. The configurations relevant to the routing and the bearer mapping are discussed below.

BH RLC Channel Configuration

As an example, when an IAB node 206d connects to the IAB network 200, it first performs initial access like normal UE. However, it may indicate its IAB node status in RRC-SetupComplete message. After that, the IAB node 206d authenticates with the operator's network and establishes IP connectivity to reach OAM functionality for OAM configuration. As discussed above, for the PDU session based OAM traffic transmission, the QoS required for OAM traffic is treated as normal UE's PDU session (for SA) or PDN connection (for NSA). During the PDU session (for SA) or PDN connection (for NSA) establishment procedure, the Core Network 202 provides the QoS information to the Donor CU 204, which establishes the DRBs for the IAB node MT for OAM traffic transmission. However, for the backhaul IP layer based OAM traffic transmission, the OAM traffic uses the IP layer on top of the adaptation layer. It is necessary for the IAB node 206d MT to establish the BH RLC channel for OAM traffic transmission.

Figure 6:
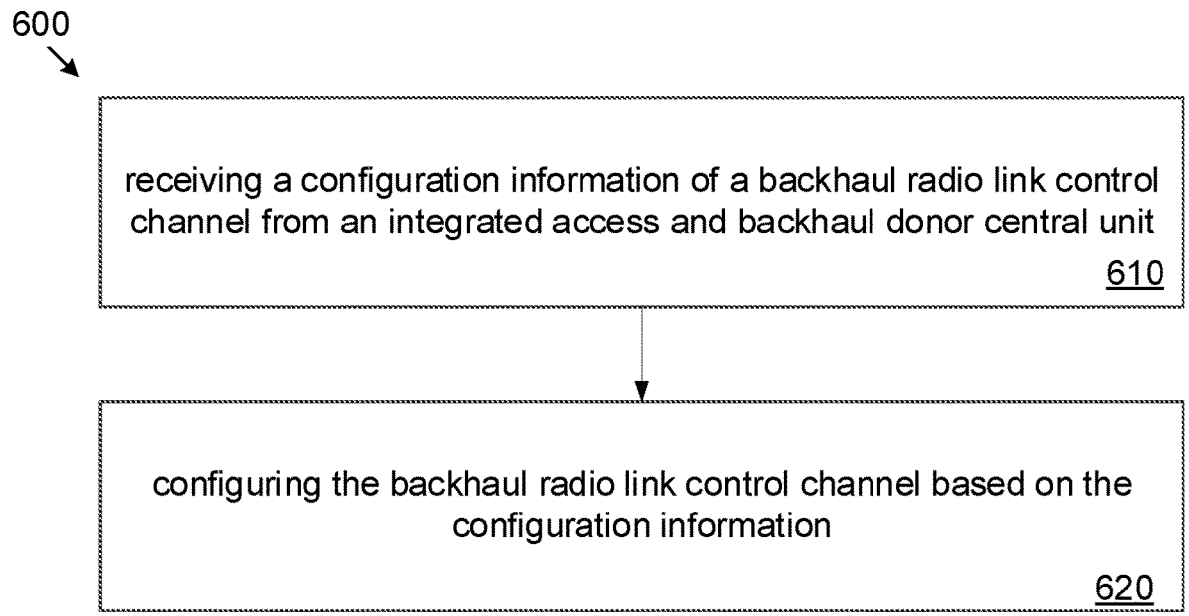
FIG. 6 shows a flow diagram of a method for wireless communication in accordance with an embodiment.

In an embodiment with reference to FIG. 6, the donor CU 204 receives a triggering message such as the RRC Setup complete message from the IAB node 206d MT and finishes the network authentication. Then, the donor CU 204 sends a first configuration information of the BH RLC channel to the parent IAB node 206a DU of the IAB node 206d MT. After the IAB node 206a DU receives the first configuration information from the donor CU 204 (step 610), it may use the first configuration information to configure the BH RLC channel (step 620). The first configuration information may a BH RLC setup information, a BH RLC modify information, or a BH RLC release information. Optionally, the first configuration information may contain a list of BH RLC channels to be setup/modify/release via F1AP message to the parent IAB node 206a DU. Optionally, the first configuration information may be also sent to the intermediate IAB node DUs and the donor DU 205 along the data forwarding path.

For each BH RLC channel to be setup/modify/release, the first configuration may include at least one of the following fields: BH RLC channel ID, BH RLC channel type (also referred to as bearer type), BH RLC channel QoS info, RLC mode, and so on. Among them, the BH RLC channel type may be one of the following: user plane data/UE bearer, control signaling, default BH RLC channel, BH RLC channel for exceptional case, OAM traffic, etc. The control signaling type may include at least one of the following type: non UE associated F1AP signaling, MT associated F1AP signaling, UE associated F1AP signaling, UE SRB0 F1AP, UE SRB1 F1AP, UE SRB2 F1AP, UE SRB3 F1AP, UE non SRB F1AP, MT SRB0 F1AP, MT SRB1 F1AP, MT SRB2 F1AP, MT SRB3 F1AP, MT non SRB F1AP. For the BH RLC channel QoS info, it may contain at least one of the following info: 5QI, ARP, GBR QoS Information, logical channel priority, etc. For the OAM traffic, the donor CU 204 may configure the parent IAB node 206a DU with default BH RLC channel or BH RLC channel specific for the OAM traffic.

For the parent IAB node 206a DU, if the received BH RLC channel configuration including logical channel priority info from the donor CU 204, it may use the logical channel priority for the logical channel associated with the BH RLC channel. Then parent IAB node 206a DU generates the RLC config, mac-logical channel config, etc., and send it to donor CU 204 for RRC configuration.

On the other hand, the donor CU 204 may send the RRCReconfiguration message to IAB node 206d MT, which includes a second configuration information for the BH RLC channel. In another embodiment with reference to FIG. 6, after the IAB node 206d MT receives the second configuration information from the donor CU 204 (step 610), it may use the second configuration information to configure the BH RLC channel (step 620). The RRC signaling based second configuration may include at least one of the following fields: BH RLC channel ID, BH RLC channel type, rlc-config and mac-logicalchannelconfig, etc. Among them, the BH RLC channel type may be one of the following: user plane data/UE bearer, control signaling, default BH RLC channel, BH RLC channel for exceptional case, OAM traffic, etc. The control signaling type may include at least one of the following type: non UE associated F1AP signaling, MT associated FLAP signaling, UE associated F1AP signaling, UE SRB0 F1AP, UE SRB1 F1AP, UE SRB2 F1AP, UE SRB3 F1AP, UE non SRB F1AP, MT SRB0 F1AP, MT SRB1 F1AP, MT SRB2 F1AP, MT SRB3 F1AP, MT non SRB F1AP.

Moreover, the IAB node 206d MT need to be configured with the BH RLC channels for control plane signaling delivery. These BH RLC channels could be used for the SCTP 4-way handshake and F1-C setup signaling transmission during IAB node integration procedure. To be specific, the BH RLC channel type can be non UE/MT associated F1AP signaling. Alternatively, the logical channel priority may be included in the BH RLC channel configuration sent by donor CU. Meanwhile, the parent IAB node 206a DU should also be configured with the BH RLC channels for control plane signaling delivery.

Once the BH RLC channel for control plane signaling delivered is configured at IAB node 206d MT and parent IAB node 206a DU, the IAB node 206d MT may initiate the SCTP association and then setup the F1-C interface via the BH RLC channel for control plane signaling.

After that, the IAB node 206d DU can provide service to UEs or to other IAB nodes. When the access UE 208b connects to the IAB node 206d DU, donor CU 204 may further decide to configure the BH RLC channel for UE associated signaling between IAB node 206d MT and parent IAB node 206a DU. Similarly, the donor CU 204 may send the BH RLC channel setup info to the parent IAB node 206a DU of IAB node 206d MT via F1AP message, which includes a configuration info of the BH RLC channel. The bearer type is UE/MT associated signaling. The bearer type can also be UE SRB0 F1AP, UE SRB1 F1AP, UE SRB2 F1AP, UE SRB3 F1AP, UE non SRB F1AP. Alternatively, the donor CU 204 may configure a higher logical channel priority for this BH RLC channel. On the other hand, the RRC signaling based BH RLC channel configuration sent by donor CU 204 to IAB node 206d MT may include the BH RLC channel for UE associated signaling. The bearer type indicates the control plane signaling for UE/MT associated signaling, or more detailed bearer type such as UE SRB0 F1AP, UE SRB1 F1AP, UE SRB2 F1AP, UE SRB3 F1AP, UE non SRB F1AP.

Finally, the access UE 208b may initiate the service request. In order to support the QoS flows of the access UE, the core network 202 sends a PDU session resource setup/modify request message to donor CU 204. Upon receiving the PDU session resource setup/modify request message, the donor CU 204 determines to establish one or more DRBs and associates BH RLC channel. The donor CU 204 sends a BH RLC channel setup/modify/release info via F1AP message to donor DU 205 as well as IAB node 206d DU along the data forwarding path. The BH RLC channel setup/modify/release info containing a list of BH RLC channels to be setup/modify/release. To be specific, it may include at least one of the following fields: BH RLC channel ID, BH RLC channel type, BH RLC channel QoS info, RLC mode, and so on. Among them, BH RLC channel type should be user plane data/UE bearer.

On the other hand, the donor CU 204 may send the RRC Reconfiguration message to IAB node 206d MT to configure the BH RLC channels. The BH RLC channel configuration includes at least one of the following fields: BH RLC channel ID, BH RLC channel type, rlc-config and mac-logicalchannelconfig, etc. BH RLC channel type may be user plane data/UE bearer. Once the UE bearer and BH RLC channel configuration is completed on IAB node 206d and donor DU 205, the UE's data packet may be delivered via the IAB network to and from the donor CU 204.

The BH RLC channel type may be explicitly indicated as one field for BH RLC channel configuration. Alternatively, different type of BH RLC channel may be configured implicitly. For example, the BH RLC channel configuration include a set of BH RLC channels for user plane and a set of BH RLC channels for control plane separately.

In another embodiment, the IPv6 flow label/DSCP/GTP-TEID/SCTP stream identifier is used for the IAB node 206d MT to differentiate the UL IP packet type and then perform routing and bearer mapping. As such, it is necessary to include the IPv6 flow label/DSCP/GTP-TEID/message type/SCTP stream identifier associated with each BH RLC channel in corresponding BH RLC channel configuration information. The donor CU 204 then send such BH RLC channel configuration information to the IAB node 206d MT via the RRCReconfiguration message.

Alternatively, the donor CU 204 may send the UL GTP-U tunnel configuration with associated IPv6 flow label/DSCP information to IAB node 206d DU. The Access IAB node 206d DU may utilize this information to encapsulate the GTP/UDP/IP header.

BAP Routing Selection and Routing Configuration

In order to support the multi-hop routing of CP/UP/OAM traffic, it is necessary to configure the routing information for each IAB node and donor DU. Generally, the routing information contains a list of routing entry. Each routing entry include the BAP routing ID, egress link. The BAP routing ID may comprises BAP address and BAP path ID. Each BAP address defines a unique destination (unique for the IAB network, either an IAB access node or the IAB donor DU). Each BAP address can have one or multiple entries in the routing table to enable local route selection. Multiple entries can be used for re-routing at radio link failure (RLF).

Figure 7:
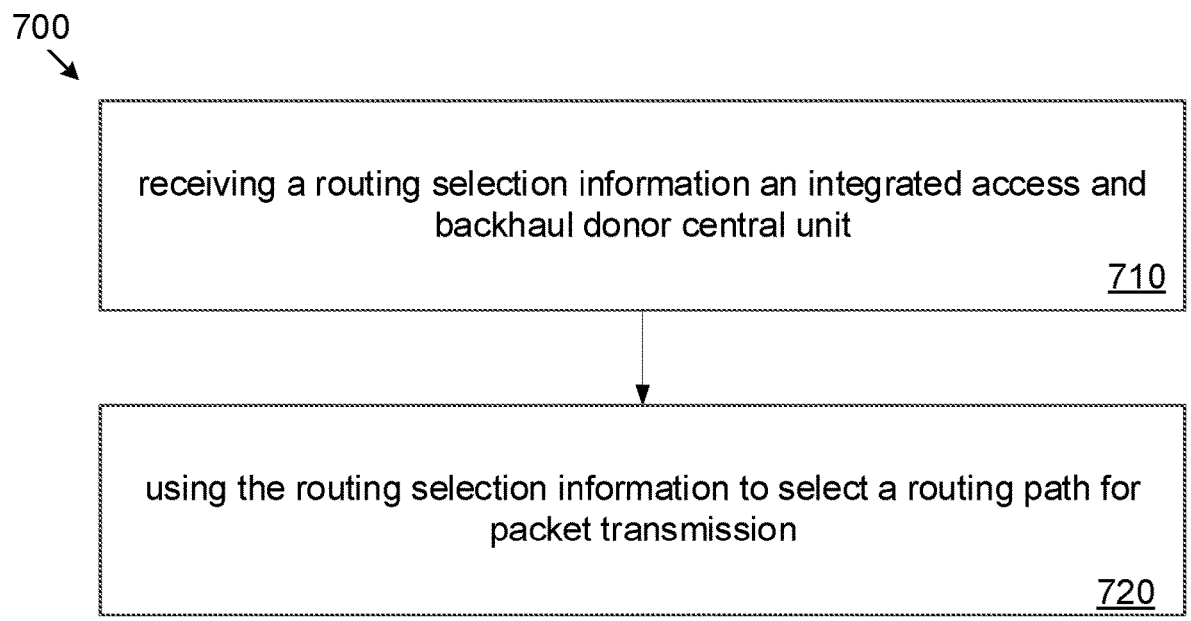
FIG. 7 shows a flow diagram of a method for wireless communication in accordance with an embodiment.

In an embodiment with reference to FIG. 7, the donor CU 204 configures the routing selection information for the donor DU 205 and access IAB node 206d, and then sends the configured routing selection information to donor DU 205 and access IAB node 206d. The donor DU 205 and access IAB node 206d receive the routing selection information (step 710), and then may use the routing selecting information to select the routing path for packet transmission (step 720). The routing selection information may include a list of routing selection entry and each entry may include the destination IP address and the BAP routing ID. Optionally, the routing selection entry may include at least one of the following info: IPv6 flow label, DSCP, DL GTP-TEID, message type, SCTP stream identifier, protocol identifier.

When donor DU 205 receives the DL packet, it detects the IP/GTP/SCTP/F1AP/TCP header and finds out the potential destination IP address, IPv6 flow label protocol identifier and DSCP field in IP header, DL GTP-TEID in GTP header, SCTP stream identifier in SCTP header, message type in F1AP message. Then based on the configured routing selection information, donor DU 205 gets the routing selection entry with the matching field of destination IP address. If multiple matching routing selection entries could be found, donor DU 205 may further check the other field, such as IPv6 flow label, DSCP, DL GTP-TEID, message type, SCTP stream identifier, protocol identifier. Then donor DU 205 select the BAP routing ID of the routing selection entry with maximum number of matching fields.

After the routing selection, the donor DU 205 add the BAP header with BAP routing ID to the DL packet. Then donor DU 205 may check the routing table to locate the routing entry with matching BAP routing ID and then get the associated egress link identifier. The egress link identifier could identify the child IAB node MT. So the donor DU 205 delivers the DL packet to the egress BH RLC channel with corresponding child IAB node MT for DL transmission. Since the routing selection table and routing table are configured by donor CU 204, donor CU 204 can assign different routing path to different traffic flow so as to realize the load balanced routing.

For the downstream IAB node, when it receives the DL packet from parent IAB node, the downstream IAB node detects the BAP routing ID included in BAP header. If the BAP address contained in the BAP routing ID refers to itself, it removes the BAP header and delivers this packet to upper layer. Otherwise, the IAB node checks the routing table and get the egress link identifier of the BAP routing ID from a matched routing entry. Finally the IAB node delivers the DL packet to the egress BH RLC channel with corresponding child IAB node MT identified by egress link identifier for DL transmission.

With regard to the UL packet, IAB node may be also configured with routing selection information for UL routing selection. Generally, the UL packets for routing selection can be divided into the following categories:

(1) UL Data Packet from Access UE Served by IAB Node DU

In another embodiment with reference to FIG. 7, the donor CU 204 configures the routing selection information for IAB node 206d MT, and then sends the configured routing selection information to the IAB node 206d MT via RRC signaling. The IAB node 206d MT receives the routing selection information (step 710), and then may use the routing selecting information to select the routing path for packet transmission (step 720). The configured routing selection information includes a list of routing selection entry. Each routing selection entry includes the destination IP address, BAP routing ID. Optionally, each routing selection entry may include at least one of the following info: IPv6 flow label, DSCP, UL GTP-TEID, UE/MT, message type, SCTP stream identifier, protocol identifier. The BAP layer of IAB node 206*d* receives the UL data packet with GTP/UDP/IP header, it detects the IP/GTP header and finds out the potential destination IP address, IPv6 flow label protocol identifier and DSCP field in IP header, UL GTP-TEID in GTP header. Then based on the configured routing selection information, IAB node 206*d* MT gets the routing selection entry with the matching field of destination IP address. If multiple matching routing selection entries could be found, IAB node 206*d* MT further check the other field, such as IPv6 flow label, DSCP, UL GTP-TEID. Then BAP entity of IAB node 206*d* selects the BAP routing ID of the routing selection entry with maximum number of matching fields. On the other hand, since it is IAB node 206*d* DU that encapsulates the GTP/UDP/IP header, it may directly deliver this UL packet with the GTP-TEID/access UE info to BAP layer. Based on these info, the BAP entity of IAB node 206*d* may get the associated BAP routing ID for the UL data packet.

(2) UE Associated Signaling for Access UE or MT Associated F1AP Signaling for Child IAB Node MT Served by IAB Node DU.

As with the above embodiment described with reference to FIG. 7, the donor CU 204 may configure the routing selection information for IAB node 206*d* MT, and then sends the configured routing selection information to the IAB node 206*d* MT via RRC signaling. The routing selection information includes a list of routing selection entry. Each routing selection entry includes the destination IP address and BAP routing ID. Optionally, each routing selection entry may include at least one of the following info: IPv6 flow label, DSCP, UL GTP-TEID, UE/MT, message type, SCTP stream identifier, protocol identifier. Here the message type may be one of the following: non UE associated F1AP signaling, non MT associated F1AP signaling, UE SRB0 F1AP, UE SRB1 F1AP, UE SRB2 F1AP, UE SRB3 F1AP, UE non SRB F1AP, MT SRB0 F1AP, MT SRB1 F1AP, MT SRB2 F1AP, MT SRB3 F1AP, MT non SRB F1AP. The IAB node 206*d* DU encapsulates the RRC signaling into one F1AP message with SCTP/IP header.

Figure 8:
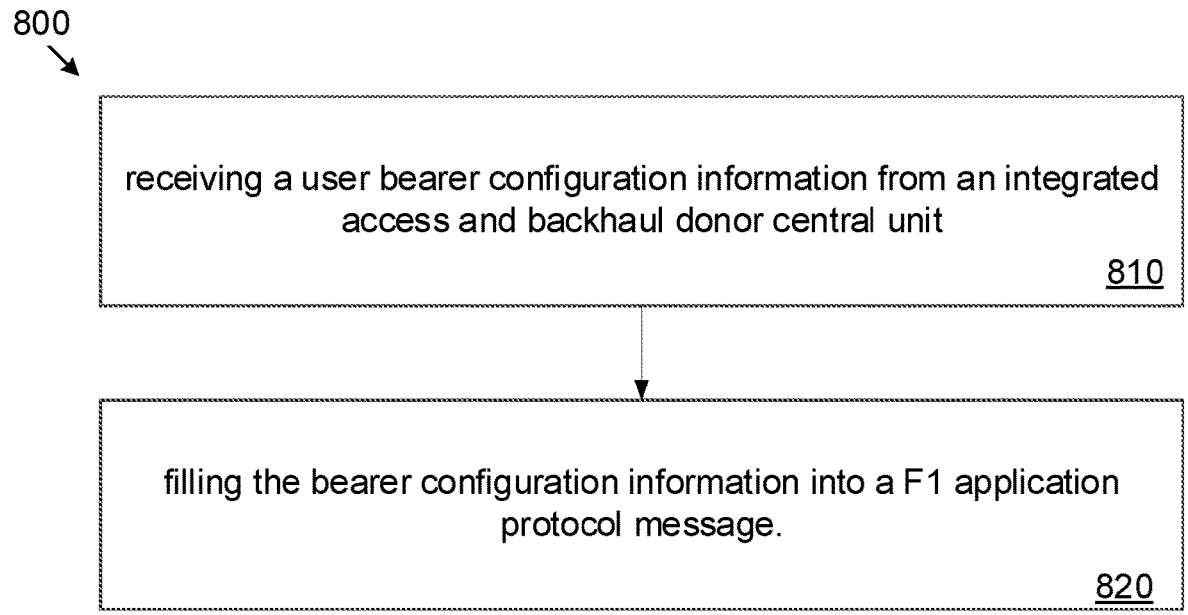
FIG. 8 shows a flow diagram of a method for wireless communication in accordance with an embodiment.

The IAB node 206*d* DU encapsulates the RRC signaling into a F1AP message with SCTP/IP header. In an embodiment with reference to FIG. 8, in order for the BAP layer of IAB node determines the BAP routing ID based on the SCTP/IP header, the donor CU 204 generates a user bearer configuration information, and then sends the user bearer configuration information to the IAB node 206*d* DU. The user bearer configuration information may include Ipv6 Flow label, DSCP, SCTP stream identifier associated with UE associated F1AP signaling or MT associated F1AP signaling. After receiving the user bearer configuration (step 810), the IAB node 206*d* DU may fill it into a SCTP/IP header of the F1AP message (step 820).

In another embodiment, the user bearer configuration information may include Ipv6 flow label, DSCP, SCTP stream identifier associated with different signaling message types. The signaling message types may comprise UE's RRC signaling from SRB0, UE's RRC signaling from SRB1, UE's RRC signaling from SRB2, UE's RRC signaling from SRB3, MT's RRC signaling from SRB0, MT's RRC signaling from SRB1, MT's RRC signaling from SRB2, and MT's RRC signaling from SRB3. Optionally, the donor CU 204 may generate a different Ipv6 Flow label/DSCP/SCTP stream identifier value for each signaling message type. Subsequently, the donor CU 204 sends the user bearer configuration information to the IAB node 206*d* DU. Based on the configuration, the IAB node 206*d* DU could fill in the Ipv6 Flow label/DSCP/SCTP stream identifier field of F1AP message's SCTP/IP header correspondingly.

Then, BAP layer of the IAB node 206*d* detects the IP/GTP header and finds out the potential destination IP address, IPv6 flow label protocol identifier and DSCP field in IP header, SCTP stream identifier in SCTP header. Based on the configured routing selection information, the IAB node 206*d* gets the routing selection entry with the matching field of destination IP address. If multiple matching routing selection entries could be found, the IAB node 206*d* further checks the other fields, such as IPv6 flow label, DSCP, SCTP stream identifier. Then BAP entity of the IAB node selects the BAP routing ID of the routing selection entry with maximum number of matching fields. On the other hand, since it is the DU part of the IAB node 206*d* that encapsulates the SCTP/IP header, it may directly deliver this UL packet with the message type info to the BAP layer of the IAB node 206*d*. Based on these info, the BAP entity of the IAB node 206*d* gets the associated BAP routing ID for the UL data packet.

(3) Non UE/MT Associated F1AP Message from IAB Node DU

The donor CU 204 may send the routing selection configuration information to IAB node 206*d* MT via RRC signaling, which includes a list of routing selection entries. Each routing selection entry includes the destination IP address, BAP routing ID. Optionally, each routing selection entry may include at least one of the following info: IPv6 flow label, DSCP, UL GTP-TED, UE/MT, message type, SCTP stream identifier, protocol identifier. Here the message type may be one of the following: non UE associated F1AP signaling, non MT associated F1AP signaling, UE SRB0 F1AP, UE SRB1 FLAP, UE SRB2 F1AP, UE SRB3 F1AP, UE non SRB F1AP, MT SRB0 F1AP, MT SRB1 F1AP, MT SRB2 F1AP, MT SRB3 F1AP, MT non SRB F1AP.

Furthermore, the donor CU 204 may send the Ipv6 Flow label/DSCP/SCTP stream identifier configuration associated with non UE associated F1AP signaling or non MT associated F1AP signaling to IAB node 206*d* DU. BAP layer of IAB node detects the IP/GTP header and finds out the potential destination IP address, IPv6 flow label protocol identifier and DSCP field in IP header, SCTP stream identifier in SCTP header. Then based on the configured routing selection information, the IAB node 206*d* gets the routing selection entry with the matching field of destination IP address. If multiple matching routing selection entries cannot be found, IAB node 206*d* further checks the other fields, such as IPv6 flow label, DSCP, SCTP stream identifier. Then BAP entity of IAB node 206*d* selects the BAP routing ID of the routing selection entry with maximum number of matching fields. On the other hand, since it is the IAB node 206*d* DU that encapsulates the SCTP/IP header, it may directly deliver this UL packet with the message type info to BAP layer. Based on these info, the BAP entity of IAB node 206*d* can get the associated BAP routing ID for the UL data packet.

(4) SCTP 4-Way Handshake Signaling from IAB Node DU

This signaling can be regarded as non UE associated F1AP signaling or non MT associated F1AP signaling and processed in the same way as other non UE/MT associated F1AP signaling.

(5) OAM Traffic from IAB Node DU

In an embodiment, the destination IP address for the OAM traffic from IAB node 206d DU is OAM server. The donor CU 204 may not be aware of the IP address of OAM server and may not configure the routing selection entry with OAM server as destination IP address. In this case, IAB node 206d may detect it is OAM traffic and then send the unknown IP address report to donor CU 204. On the side of the donor CU 204, in an embodiment, the donor CU 204 receives the report on the unknown destination IP address. Then the donor CU 204 sends a routing information associated with the reported IP address to the IAB node 206d. For example, the donor CU 204 may reconfigure a routing selection information with the mapping between reported IP address and BAP routing ID and send the routing selection information to the IAB node 206d. For another example, the donor CU 204 may send the default BAP routing ID configuration to IAB node 206d. Once the IAB node 206d detects the packet whose destination IP address does not have matching routing selection entry, the IAB node may associate the packet with the default BAP routing ID.

Bearer Mapping Configuration

After the donor DU 205 selects the BAP routing ID and add the BAP subheader to the DL packet, donor DU 205 needs to perform bearer mapping and map the DL packet to the egress BH RLC channel. In an embodiment with reference to FIG. 9, the donor CU 204 configures a bearer mapping configuration information for the donor DU 205, and then sends the bearer mapping configuration information to donor DU 205 for example via a F1 AP message. The donor DU 205 receives the bearer mapping configuration information (step 910), and may use the bearer mapping configuration to select an egress backhaul radio link control channel for packet transmission (step 920). The bearer mapping configuration information may include a list of bearer mapping entries. Each bearer mapping entry may include egress BH RLC channel ID. Optionally, the bearer mapping entry may further include at least one of the following fields: the destination IP address, IPv6 flow label, DSCP, DL GTP-TEID, UL GTP-TEID, message type, SCTP stream identifier, protocol identifier.

Figure 9:
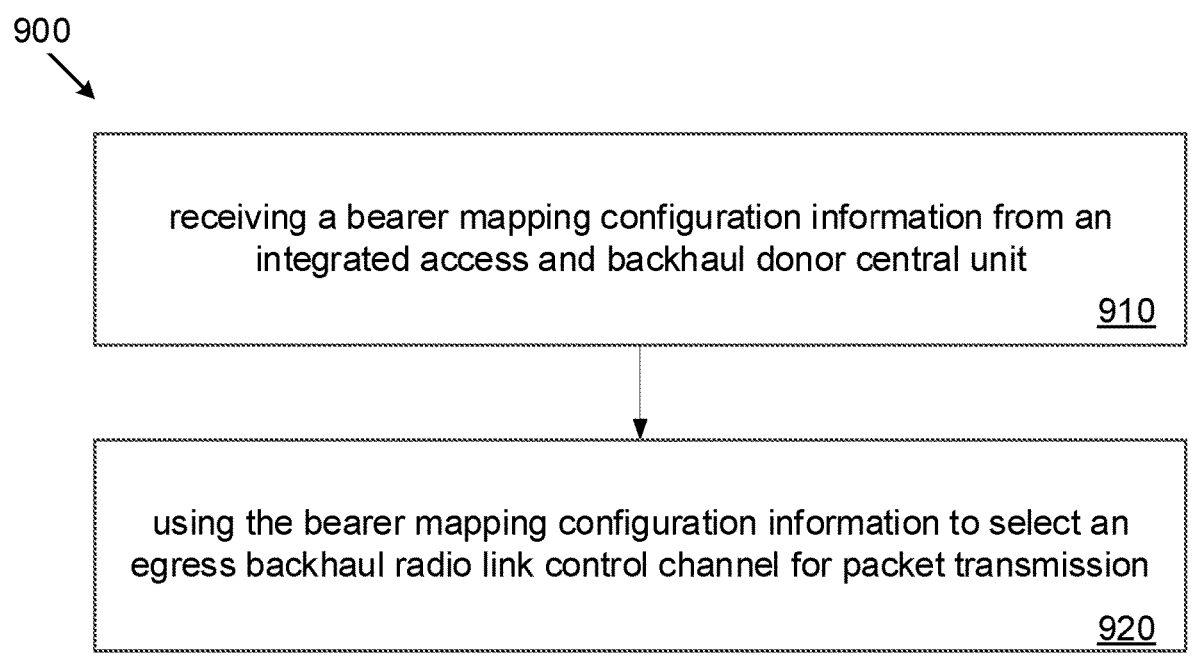
FIG. 9 shows a flow diagram of a method for wireless communication in accordance with an embodiment.

For the access IAB node such as IAB node 206d, in another embodiment with reference to FIG. 9, the donor CU 204 configures a bearer mapping configuration information for the donor DU 205, and then sends the bearer mapping configuration to IAB node 206d for example via a RRC signaling. The IAB node 206d receives the bearer mapping configuration information (step 910), and may use the bearer mapping configuration to select an egress backhaul radio link control channel for packet transmission (step 920). Similarly, the bearer mapping configuration information may include a list of bearer mapping entries. Each entry include the egress BH RLC channel ID. Optionally, the bearer mapping entry may include at least one of the following fields: the destination IP address, IPv6 flow label, DSCP, DL GTP-TEID, UL GTP-TEID, message type, SCTP stream identifier, protocol identifier. Here the message type may be one of the following: non UE associated F1 AP signaling, MT associated F1 AP signaling, UE associated F1 AP signaling, UE SRB0 F1AP, UE SRB1 F1AP, UE SRB2 F1AP, UE SRB3 F1AP, UE non SRB F1AP, MT SRB0 F1AP, MT SRB1 F1AP, MT SRB2 F1AP, MT SRB3 F1 AP, MT non SRB F1AP. Furthermore, the donor CU 204 may send the Ipv6 Flow label/DSCP/SCTP stream identifier configuration associated with non UE associated F1AP signaling or non MT associated F1AP signaling to IAB node 206d DU. Upon receiving the UL packet, the access IAB node 206d determines the matching entry and then derives the egress BH RLC channel on the egress link.

Link Failure Handling

Figure 10:
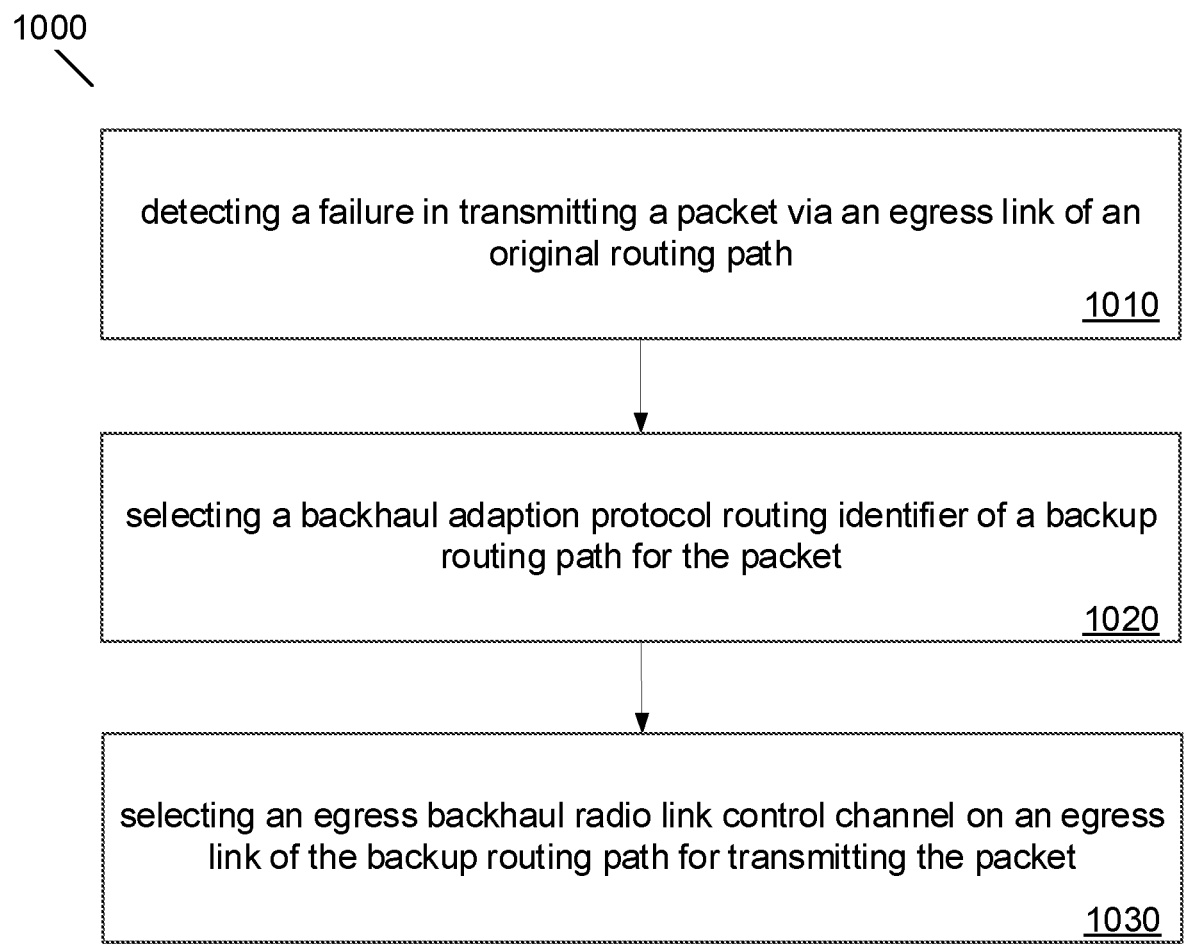
FIG. 10 shows a flow diagram of a method for wireless communication in accordance with an embodiment.

When IAB node MT/DU such as IAB node 206a detects egress link failure of UL/DL packet, IAB node 206a MT/DU needs to find backup routing path for the UL/DL packet. In an embodiment with reference to FIG. 10, the IAB node 206a MT/DU detects a failure in transmitting a packet via an egress link of an original routing path (step 1010). In response to the detection of such failure, the IAB node 206a MT/DU selects a BAP routing ID of a backup routing path for the packet (step 1020), and then selecting an egress link of the backup routing path for transmitting the packet (step 1030).

At step 1020, if the packet is a DL packet, the IAB node 206a DU may select the backup routing path whose BAP routing ID associates with the same destination BAP address with the original routing path but that has different egress link than the original routing path. If the packet is an UL packet, the IAB node 206a MT may select the backup routing path having different egress link than the original path. When such backup routing path is selected from routing table, IAB node 206a MT/DU may set the BAP routing ID carried in the BAP header of UL/DL packet to the new BAP routing ID of the backup routing path.

At step 1030, the IAB node 206a MT/DU select an egress BH RLC channel on the egress link of the backup routing path for packet transmission, which can be implemented in various manners.

In an implementation, for the packet re-routing, the IAB node 206a MT/DU always uses the default BH RLC channel to transmit the packet.

In another implementation, the IAB node 206a MT/DU searches the bearer mapping configuration information such as bearer mapping table. If the bearer mapping entry between egress BH RLC channel on the egress link of backup routing path and ingress BH RLC channel receiving the UL/DL packet is located, the IAB node 206a MT/DU may use this egress BH RLC channel for packet transmission.

As for the access IAB node such as IAB node 206d MT/DU or donor DU 205, it may search the bearer mapping configuration for an egress BH RLC channel on the egress link of backup routing path based on a packet type information of the UL/DL packet. The packet type information may include IPv6 flow label, DSCP, destination IP address, GTP-TEID/SCTP stream identifier, and message type information of the UL/DL packet. If the IAB node 206d or donor DU 205 locates such egress BH RLC channel in the bearer mapping configuration, it may use this egress BH RLC channel as the backup BH RLC channel for UL/DL packet transmission. However, if such egress BH RLC channel is not located, the IAB node 206d or donor DU 205 may utilize the default BH RLC channel on egress link of the backup routing path as the backup BH RLC channel for packet transmission;

Optionally, the IAB node 206a MT/DU may obtain a logical channel/BH RLC channel priority threshold for egress BH RLC channel mapping from the donor CU 204. The channel priority threshold may be configured by the donor CU 204. As such, when the egress link failure is detected on the original routing path, only if the located egress BH RLC channel has a logical channel/BH RLC channel priority higher than or equal to the configured logical channel/BH RLC channel priority threshold, may the IAB node 206a MT/DU use the located egress BH RLC channel on the egress link of the backup routing path as the backup BH RLC channel. Otherwise, the IAB node 206a MT/DU can only use the default BH RLC channel on egress link of the backup routing path as the backup BH RLC channel.

When both the egress link and egress BH RLC channel on backup routing path are determined, IAB node 206a MT/DU may set the BAP routing ID carried in the BAP header of UL/DL packet to the new BAP routing ID of backup routing path. Otherwise, the IAB node 206a MT/DU may report the link failure to donor CU 204 or perform re-establishment. The donor CU 204 may setup/modify the BH RLC channels and reconfigure the bearer mapping, routing selection and routing configuration on IAB node.

Furthermore, more than one default BH RLC channel may be configured by donor CU 204. These default BH RLC channels might be used for difference purpose, for example, two default BH RLC channels for control plane traffic and user plane traffic respectively.

Other Failure Handlings

Figure 11:
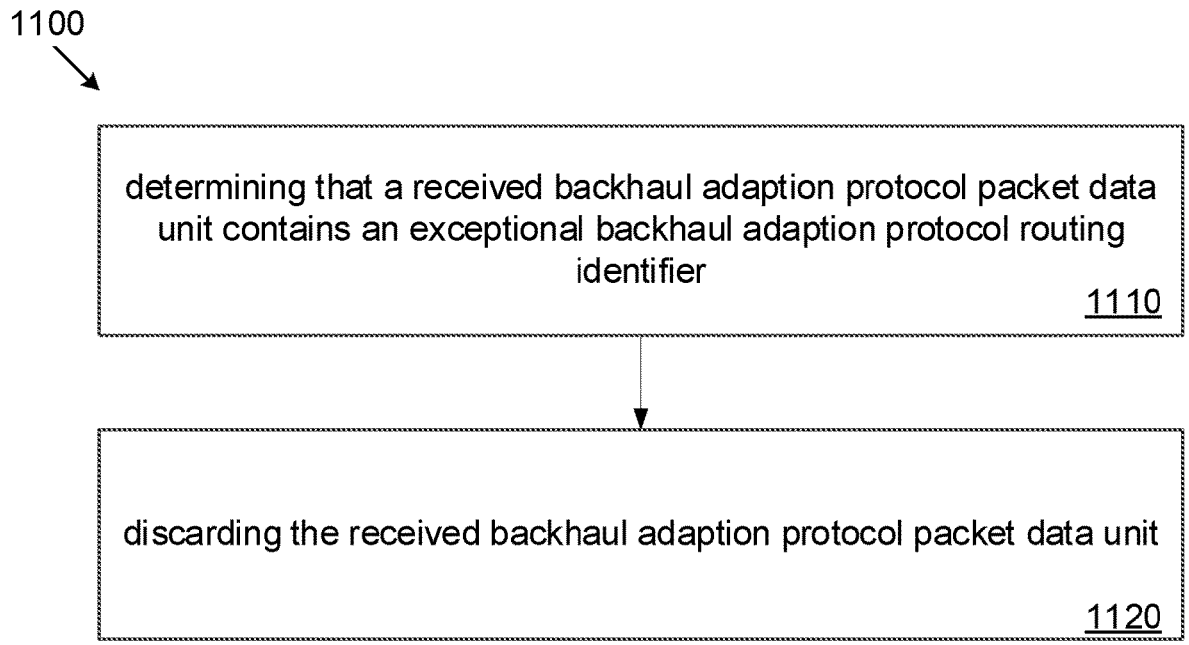
FIG. 11 shows a flow diagram of a method for wireless communication in accordance with an embodiment.

In an embodiment with reference to FIG. 11, A BAP entity of an IAB node 206a MT/DU receives a BAP PDU and determines that the BAP PDU contain exceptional BAP routing ID (step 1110). The exceptional BAP routing ID can be a reserved BAP routing ID, an BAP routing ID that is not configured, or an invalid BAP routing ID. Then, the BAP entity of the IAB node 206a MT/DU may at least discard the received BAP PDU (step 1120).

Figure 12:
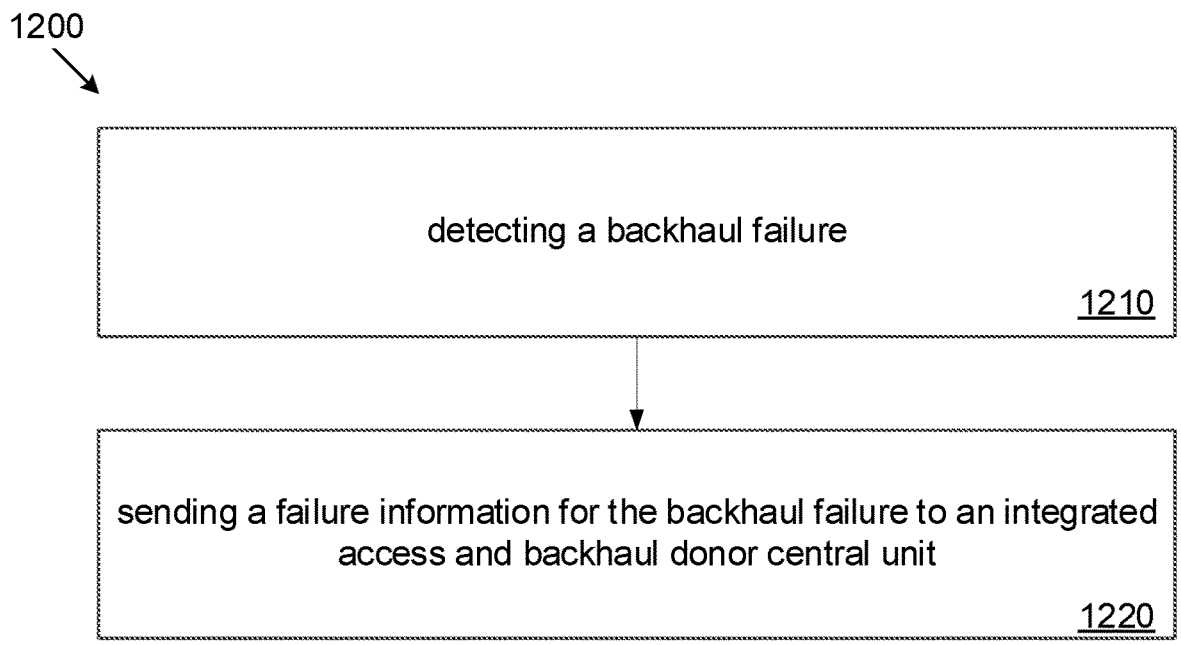
FIG. 12 shows a flow diagram of a method for wireless communication in accordance with an embodiment.

In an embodiment with reference to FIG. 12, IAB node 206a MT detects a failure of a BH RLC channel in transmitting a packet (step 1210). For example, the IAB node 206a MT may determine that the BH RLC channel fails when the number of retransmitting the packet via this BH RLC channel reaches a predetermined threshold number. In response to the failure, the IAB node 206a MT sends such failure to donor CU 204 (1220). Alternatively, in response to the failure, the IAB node 206a MT may performs a RRC re-establishment.

In an embodiment with reference to FIG. 12, the IAB node 206a MT detects an adaption failure of BAP configuration in transmitting a packet (step 1210), and then sends the failure information for the adaption failure to donor CU 204 (step 1220). The failure information may include a cause of the adaption failure including (1) the BH RLC routing ID contained in the packet is not configured in the routing information, i.e. BAP routing ID not configured; (2) a destination IP address contained in the packet is not configured in a routing selection information or a bearer mapping information, i.e. destination IP address not configured; (3) the bearer mapping information presents duplicate egress BH RLC channels for transmitting the packet on a single egress link, i.e. duplicate BH RLC channel; and (4) the bearing mapping information does not present an egress BH RLC channel for transmitting the packet and a default BH RLC channel is not configured, i.e. no appropriate egress BH RLC channel for mapping.

If the cause of failure is "BAP routing ID not configured," the failure information may further include the BAP routing ID that is not configured. If the cause of failure is "destination IP address not configured," the failure information may further include the destination IP address that is not configured. If the cause of failure is "duplicate BH RLC channel," the cause of failure may further include a BH RLC channel ID of the duplicate egress BH RLC channel and a BH RLC channel ID of an ingress BH RLC channel receiving the packet. If the cause of failure is "no appropriate egress BH RLC channel for mapping," the failure information may further include IPv6 flow label, DSCP, GTP-TEID, SCTP stream identifier and message type with respect to the packet. Optionally and alternatively, in the case of "no appropriate egress BH RLC channel for mapping," the failure information may further include a BH RLC channel ID of an ingress BH RLC channel receiving the packet.

Similar to the IAB node 206a MT in the embodiment of FIG. 12, the donor DU 205 and IAB node 206a DU may also detects the adaption failure, and then send the failure information to the donor CU 204 via F1 AP message. The failure Information may include the BAP failure cause such as "BAP routing ID not configured," "destination IP address not configured," "duplicate BH RLC channel," and "no appropriate egress BH RLC channel for mapping." In addition, the IAB node 206a DU or donor DU 205 may send one of the following information in the failure information to donor CU 204, such as the BAP routing ID that is not configured, the destination IP address that is not configured, the ingress/egress BH RLC channel ID of duplicate BH RLC channel, etc. For the failure cause of "no appropriate egress BH RLC channel for mapping failure," the IAB node 206a DU/donor DU 205 may report the IPv6 flow label/DSCP/GTP-TEID/SCTP stream identifier/message type of data packet or ingress BH RLC channel ID info to donor CU 204.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
   detecting, by an integrated access and backhaul entity, a failure in transmitting a packet via an egress link of an original routing path;
   in response to the packet being a downlink packet, selecting, by the integrated access and backhaul entity, a backup routing path whose backhaul adaption protocol routing identifier associates with a same destination backhaul adaption protocol address with a backhaul adaption protocol routing identifier of the original routing path but having a different egress link than the original routing path;
   in response to the packet being an uplink packet, selecting, by the integrated access and backhaul entity, the backhaul adaption protocol routing identifier of the backup routing path having a different egress link than the original routing path regardless of whether a backhaul adaption protocol routing identifier of the backup routing path associates with a same destination backhaul adaption protocol address with a backhaul adaption protocol routing identifier of the original routing path; and
   selecting, by the integrated access and backhaul entity, an egress backhaul radio link control channel on an egress link of the backup routing path for transmitting the packet.

2. The method of claim 1, wherein the selecting the egress backhaul radio link control channel comprises:
   selecting a default backhaul radio link control channel on the egress link of the backup routing path for transmitting the packet.

3. The method of claim 1, wherein the selecting the egress backhaul radio link control channel comprises:
   searching a bearer mapping configuration of the integrated access and backhaul node for a bearer mapping between an egress backhaul radio link control channel on the egress link of the backup routing path and an ingress backhaul radio link control channel receiving the packet;
   in response that the bearer mapping exists, delivering the packet to the egress backhaul radio link control channel for transmission.

4. The method of claim 1, wherein the selecting the egress backhaul radio link control channel comprises:
   searching a bearer mapping configuration of the integrated access and backhaul node for an egress backhaul radio link control channel on the egress link of the backup routing path based on a packet type information of the packet;
   in response that the egress backhaul radio link control channel exists, delivering the packet to the egress backhaul channel for transmission.

5. The method of claim 4, wherein the packet type information comprises a mapping between egress backhaul radio link control channel and IPv6 flow label, a differentiated service code point (DSCP), destination internet protocol address, a general packet radio service tunneling protocol (GTP) tunnel endpoint identifier (GTP-TEID), a stream control transportation protocol (SCTP) stream identifier, and a message type.

6. The method of claim 4, wherein the selecting the egress backhaul radio link control channel comprises:
   in response that the egress backhaul radio link control channel does not exist, delivering the packet to default backhaul radio link control channel on the egress link of the backup routing path for transmission.

7. The method of claim 3, the method further comprises:
   obtaining, by the integrated access and backhaul entity, a channel priority threshold for egress backhaul radio link control channel mapping;
   wherein the selecting the egress backhaul radio link control channel for packet transmission comprises:
      selecting the egress backhaul radio link control channel for packet transmission only if the priority of the egress backhaul radio link control channel is higher than or equal to the channel priority threshold.

8. The method of claim 7, the method further comprises:
   in response that the priority of the egress backhaul radio link control channel is lower than the channel priority threshold, selecting, by the integrated access and backhaul entity, a default backhaul radio link control channel on the egress link of the backup routing path for transmitting the packet.

* * * * *